(12) United States Patent
Kim

(10) Patent No.: US 7,404,606 B2
(45) Date of Patent: Jul. 29, 2008

(54) DEVICE MAINTAINING HEIGHT OF AN ACTIVE HEADREST

(75) Inventor: Seok Hwan Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/705,268

(22) Filed: Feb. 12, 2007

(65) Prior Publication Data
US 2008/0129093 A1 Jun. 5, 2008

(30) Foreign Application Priority Data
Dec. 5, 2006 (KR) .................. 10-2006-0122436

(51) Int. Cl.
*A47C 1/10* (2006.01)
(52) U.S. Cl. .................. 297/408; 297/410; 297/216.12; 297/216.13; 297/216.14
(58) Field of Classification Search .......... 297/216.13, 297/216.12, 216.14, 410, 408
See application file for complete search history.

(56) References Cited

U.S. PATENT DOCUMENTS

| 6,045,181 | A | 4/2000 | Ikeda et al. |
| 6,352,285 | B1 | 3/2002 | Schulte et al. |
| 6,416,125 | B1 * | 7/2002 | Shah et al. ............. 297/216.12 |
| 6,568,753 | B1 * | 5/2003 | Watanabe .............. 297/216.12 |
| 6,719,368 | B1 * | 4/2004 | Neale .................... 297/216.14 |
| 6,749,256 | B1 * | 6/2004 | Klier et al. ............. 297/216.12 |
| 7,077,472 | B2 * | 7/2006 | Steffens, Jr. ........... 297/216.13 |
| 7,097,242 | B2 * | 8/2006 | Farquhar et al. ....... 297/216.12 |

FOREIGN PATENT DOCUMENTS

| JP | 2005-212596 | 8/2005 |
| JP | 2006-027593 | 2/2006 |
| KR | 1998-051709 | 10/1998 |
| KR | 100185085 | 12/1998 |
| KR | 2005-0034988 | 4/2005 |
| KR | 2005-0047590 | 5/2005 |

* cited by examiner

Primary Examiner—David R Dunn
Assistant Examiner—Erika Garrett
(74) Attorney, Agent, or Firm—Morgan Lewis & Bockius LLP

(57) ABSTRACT

A device for maintaining height of a headrest relative to a seatback frame includes: a suspension disposed in the seat back frame, configured to be pushed by a passenger during a crash; a linkage rotatably coupled to the seat back frame and rotatably supporting the suspension; and a fixing link inside the seat back frame for maintaining a rotational position of the linkage so as to maintain a height of the suspension.

8 Claims, 3 Drawing Sheets

DEVICE MAINTAINING HEIGHT OF AN ACTIVE HEADREST

CROSS-REFERENCE TO RELATED APPLICATION

This application claims priority to and the benefit of Korean Patent Application No. 10-2006-0122436 filed in the Korean Intellectual Property Office on Dec. 5, 2006, the entire contents of which are incorporated herein by reference.

BACKGROUND OF THE INVENTION (a) Field of the Invention

The present invention relates to a device for maintaining height of an active headrest, and more particularly to such a device in which the height at which the headrest is locked varies depending on the amount of force of a vehicle crash.

(b) Description of the Related Art

An active headrest is a general term that refers to a headrest that automatically rises and supports the head of a passenger to protect the passenger's head and neck in a vehicle crash.

A conventional active headrest includes a self locking device. However, the conventional self locking device locks only if the active headrest rises higher than a reference height, keeping the active headrest raised. That is, the height of the active headrest can be maintained only if force of the crash is greater than a reference value.

SUMMARY OF THE INVENTION

The present invention provides a device for maintaining height of an active headrest in which a height at which the headrest is locked varies depending on force of a crash.

An exemplary embodiment of the present invention provides a device for maintaining height of an active headrest which rotates and rises to support the head and neck of a passenger. A suspension is installed inside a seat back frame to support the passenger's upper body. The suspension includes a linkage rotatably coupled to an inside of the seat back frame and rotatably supporting the suspension; and a fixing link inside the seat back frame, securing a rotational position of the linkage to fix the height of the suspension.

The linkage may be L-shaped, with a first end extended toward the rear of the suspension, an elbow rotatably connected to the seat back frame by a first hinge, and a second end rotatably connected to a side of the suspension by a second hinge, so as to rotatably support the suspension.

The linkage may further include a slot between the first hinge and the second hinge, and a plurality of hooking strips with a sawtooth shape at an inside of the slot.

A first end of the fixing link may be attached to the seat back frame. A second end of the fixing link may extend toward the slot. The fixing link may be hooked to a hooking strip at a lower part of the slot if amount of rotation of the suspension is small, and to a hooking strip at an upper part of the slot if amount of rotation of the suspension is large, thereby preventing the suspension from returning to its original position.

The fixing link may further include a hooking protrusion hooked to the hooking strip at an end portion of the fixing link.

One end of the linkage may extend toward the rear of the suspension, the other end of the linkage may be fixed to the seat back frame, and the linkage may be returned to an original position thereof by a restoration spring, which is extended when the linkage is rotated by the suspension, and is returned if force acting on the suspension is removed.

One end of the restoration spring may be attached to the seat back frame by a bracket provided with a hook.

The hooking protrusion may be wider than the slot, and may be made of elastic material.

DESCRIPTION OF REFERENCE NUMERALS INDICATING PRIMARY ELEMENTS IN THE DRAWINGS

| | |
|---|---|
| 100: seat | 200: active headrest |
| 300: seat back frame | 400: suspension |
| 500: linkage | 510: slot |
| 512: hooking strip | 520: first hinge |
| 530: second hinge | 600: fixing link |
| 610: hooking protrusion | 700: restoration spring |
| 800: fixing bracket | 810: hook |

DETAILED DESCRIPTION OF THE PREFERRED EMBODIMENTS

An exemplary embodiment of the present invention will hereinafter be described in detail with reference to the accompanying drawings.

Figure 1:
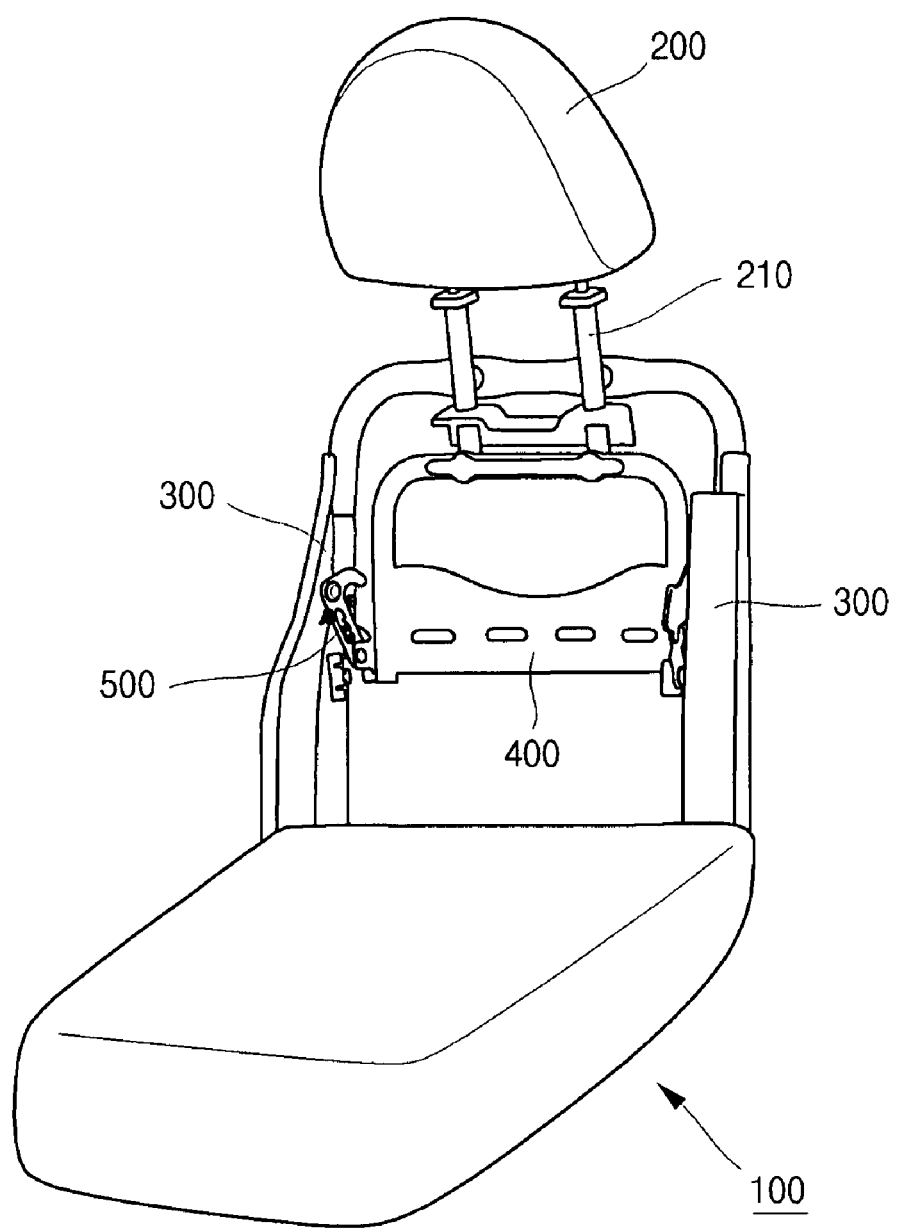
FIG. 1 is a perspective view showing the inside of a seat to which a device for maintaining height of an active headrest according to an exemplary embodiment of the present invention is mounted.

As shown in FIG. 1, an active headrest 200 according to an exemplary embodiment of the present invention is connected to a suspension 400 which is installed inside a seat back frame 300 by a supporting frame 210 and is supported by the same.

The suspension 400 is plate shaped and extends across a substantial portion of the width inside the seat back frame 300. If a passenger is pushed rearward by a rear collision, the suspension 400 is raised while being pushed rearward. Then, the suspension 400 rotates, raising the supporting frame 210, and the active headrest 200 along with it, supporting the head and neck of the passenger.

If the suspension 400 does not return to its original position, the height of the active headrest 200 is maintained in a state of supporting the passenger's head and neck. The height of the suspension 400 is maintained by a linkage 500 and a fixing link 600.

Figure 2:
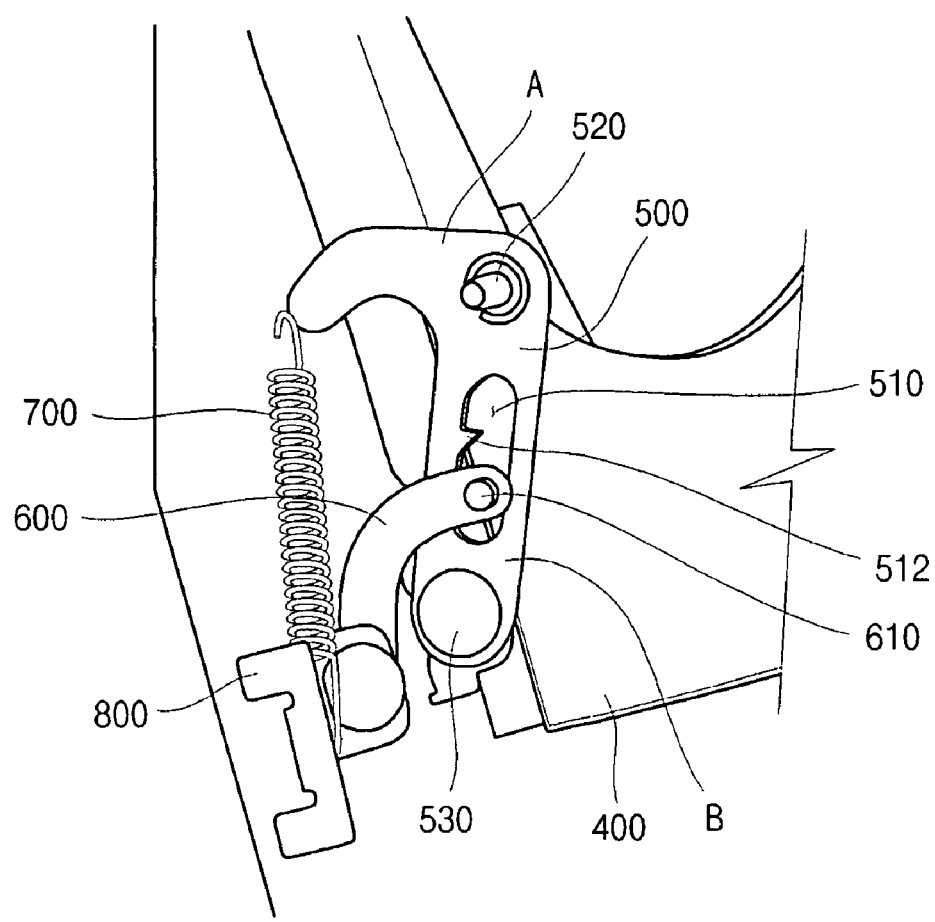
FIG. 2 is a perspective view showing the outside of the device of FIG. 1.
Figure 3:
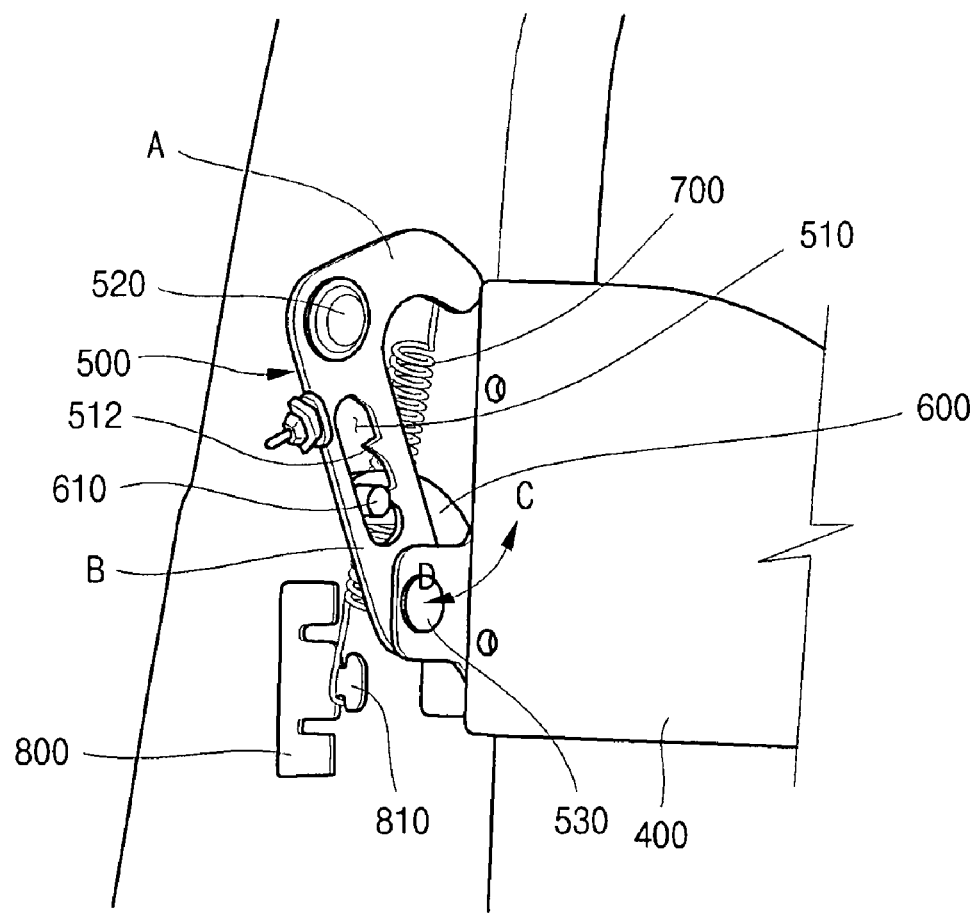
FIG. 3 is a perspective view showing the inside of the device of FIG. 1.

As shown in FIG. 2 and FIG. 3, the linkage 500 is connected to both sides of the suspension 400. The linkage 500 may be L-shaped. A first hinge 520 may be connected to the linkage 500 so that the linkage 500 is rotatably connected to the seat back frame 300.

A first end of the linkage 500 extends toward the rear of the suspension 400, and a second end extends along and is coupled to the side of the suspension 400 by a second hinge 530. Accordingly, the linkage 500 rotatably supports the suspension 400 to the seat back frame 300. Hereinafter, the portion extending toward the rear of the suspension is referred to as portion A, and the portion between the first hinge and the second hinge is referred to as portion B.

A slot 510 is formed along portion B of the linkage 500.

A hooking protrusion 610 on the fixing link 600 is housed in the slot 510 so as to move along the slot 510. A plurality of hooking strips 512, with a sawtooth shape, are provided inside the slot 510 and serve to catch the hooking protrusion 610.

As shown in FIG. 2, the fixing link 600 is attached at a first end to the seat back frame 300. A second end thereof extends toward the slot 510. The hooking protrusion 610 is provided on the second end of the fixing link 600.

The hooking protrusion 610 slides upwards within the slot 510 by rotation of the linkage 500, and is then hooked by the hooking strip 512, thereby preventing reverse rotation of the linkage 500. Since the linkage 500 should be returned to its original position by a restoration spring 700 which will be described later, the width of the hooking protrusion 610 may be slightly greater than the width of the slot 510.

In addition, since the hooking protrusion 610 is hooked by the hooking strip 512 and then should slide downward along the slot 510 during the return of the linkage 500, the hooking protrusion 610 may be able to be elastically deformed so as to pass through the narrow width of the slot 510. The hooking protrusion 610 may therefore be made of material that can return to its original shape after some deformation, such as, without limitation, plastic or rubber.

As shown in FIG. 2 and FIG. 3, a first end of a restoration spring 700 is attached to portion A of the linkage 500, and a second end is attached to a hook 810 of a fixing bracket 800, provided inside the seat back frame 300. The restoration spring 700 returns the active headrest 200 to its original position after the operation thereof.

That is, since the restoration spring 700 extends when portion B of the linkage 500 rotates in a direction C (FIG. 3), it urges portion B of the linkage 500 to rotate in a direction D by the restoring force. While portion B rotates in the direction D, the suspension 400, which has been raised, is lowered. While the suspension 400 is lowered, the supporting frame 210 is also lowered, and thereby the active headrest 200 is also lowered so as to return to its original position.

Operation of a device for maintaining height of an active headrest according to an exemplary embodiment of the present invention will be explained hereinafter.

If force acts on a passenger during a rear crash, the passenger's upper body moves rearward. The suspension 400 rotates by force acting on the suspension 400, and is pushed rearward, rising simultaneously.

Portion B of the linkage 500 rotates in a direction C by the rotation of the suspension 400 (referring to FIG. 3). Accordingly, the second hinge 530 rises in the direction C, and the hooking protrusion 610 of the fixing link 600 rises along the slot 510 and is hooked therein.

If the force acting on the suspension 400 is removed, the linkage 500 will tend to return to its original position by weight of the suspension 400. However, since the hooking protrusion 610 is hooked by the hooking strip 512, the linkage 500 is kept in the raised position, preventing rotation of the suspension 400, and maintaining the position of the active headrest 200.

Force caused by the body of the passenger varies depending on force by the vehicle crash, and thereby force pressing the suspension 400 also varies. As force increases, amount of rotation of the suspension 400 increases, and thereby amount of rotation of the linkage 500 also increases, increasing the height at which the hooking protrusion 610 of the fixing link 600 is raised. If the force acting on the suspension 400 is removed, the hooking protrusion 610 is hooked to a hooking strip 512 that is relatively higher on the slot 510.

Since a fixing height of the active headrest 200 varies depending on force of the crash, the active headrest operates even when the force is small, thereby continuously supporting the head and neck of the passenger. Accordingly, injuries on a passenger can be minimized.

The suspension 400 returns toward the front of the seat 100 if the linkage 500 rotates in the direction D by the restoring force of the restoration spring 700. Accordingly, the supporting frame 210 lowers, and the active headrest 200 returns to its original position.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for maintaining height of a headrest relative to a seatback frame, comprising:
   a suspension disposed in the seat back frame, configured to be pushed by a passenger during a crash;
   a linkage rotatable coupled to the seat back frame and rotatably supporting the suspension; and
   a fixing link inside the seat back frame for maintaining a rotational position of the linkage so as to maintain a height of the suspension, wherein the linkage is substantially L-shaped; a first end of the linkage extends rearward; an elbow of the linkage is rotatably connected to the seat back frame; and a second end of the linkage is rotatably connected to the suspension.

2. The device of claim 1, wherein the linkage further comprises a slot and a plurality of sawtooth-shaped hooking strips inside the slot.

3. The device of claim 2, wherein a first end of the fixing link is attached to the seat back frame, a second end of the fixing link extends toward the slot, the fixing link is hooked to a lower one of the hooking strips if an amount of rotation of the suspension is small, and the fixing link is hooked to an upper one of the hooking strips if the amount of rotation of the suspension is large.

4. The device of claim 2, wherein the fixing link further comprises a hooking protrusion configured to be hooked to one of the hooking strips.

5. The device of claim 4, wherein the hooking protrusion is wider than a width of the slot.

6. The device of claim 4, wherein the hooking protrusion comprises an elastic material.

7. The device of claim 1, wherein the linkage is biased toward an original position thereof by a spring.

8. The device of claim 7, wherein an end of the spring is attached to the seat back frame.

* * * * *